United States Patent [19]

Bloys et al.

[11] Patent Number: 5,038,863
[45] Date of Patent: Aug. 13, 1991

[54] CEMENTING OIL AND GAS WELLS

[75] Inventors: James B. Bloys; William N. Wilson, both of Plano; Roger D. Bradshaw, Allen, all of Tex.

[73] Assignee: Altantic Richfield Company, Los Angeles, Calif.

[21] Appl. No.: 556,011

[22] Filed: Jul. 20, 1990

[51] Int. Cl.$^5$ .................. E21B 33/14; E21B 33/16
[52] U.S. Cl. ........................... 166/291; 166/293
[58] Field of Search ............... 166/291, 292, 293; 106/661, 727, 728; 523/130

[56] References Cited

U.S. PATENT DOCUMENTS

| 2,805,719 | 9/1957 | Anderson. | |
|---|---|---|---|
| 3,168,139 | 2/1965 | Kennedy et al.. | |
| 3,412,795 | 11/1968 | Terry. | |
| 3,499,491 | 3/1970 | Wyant et al. | 166/292 |
| 3,557,876 | 1/1971 | Tragesser | 166/292 |
| 3,563,313 | 2/1971 | Spangle | 166/292 |
| 3,730,900 | 5/1973 | Perricone et al.. | |
| 3,887,009 | 6/1975 | Miller et al. | 166/292 |
| 3,937,282 | 2/1976 | Shryock et al. | 166/293 |
| 3,952,805 | 4/1976 | Persinski et al. | 166/293 |
| 4,015,991 | 4/1977 | Persinski et al. | 166/293 |
| 4,036,660 | 7/1977 | Persinski et al.. | |
| 4,102,400 | 7/1978 | Crinkelmeyer et al. | 166/283 |
| 4,124,075 | 11/1978 | Messenger | 166/293 |
| 4,176,720 | 12/1979 | Wilson | 166/293 |
| 4,217,229 | 8/1980 | Watson | 166/291 |
| 4,373,956 | 2/1983 | Rosskopf | 106/727 X |
| 4,450,010 | 5/1984 | Burkhalter et al. | 166/293 X |
| 4,466,837 | 8/1984 | Chatterji et al. | 166/292 |
| 4,476,029 | 10/1984 | Sy et al.. | |
| 4,480,693 | 11/1984 | Newlove et al. | 166/293 |
| 4,581,147 | 4/1986 | Branch. | |
| 4,595,736 | 6/1986 | Patel. | |
| 4,601,758 | 7/1986 | Nelson | 166/293 |
| 4,606,770 | 8/1986 | Gerber | 106/727 |
| 4,632,186 | 12/1986 | Boncan et al. | 166/293 |
| 4,646,834 | 3/1987 | Bannister | 166/291 |
| 4,680,128 | 7/1987 | Portnoy | 252/8.551 |
| 4,806,164 | 2/1989 | Brothers | 166/293 |
| 4,883,125 | 11/1989 | Wilson et al. | 166/291 |

Primary Examiner—George A. Suchfield
Attorney, Agent, or Firm—James C. Fails; Arthur F. Zobal; Geoffrey A. Mantooth

[57] ABSTRACT

A cement method and composition for cementing a well penetrating subterranean formations and aqueous based drilling fluid containing at least one cement retarder characterized by a major proportion of the drilling fluid from the well as it was drilled; water; a lesser proportion of dry cementitious material; a minor amount of a dispersant that does not effect satisfactory set cement within an acceptable time interval; and an accelerator selected from the class consisting of acetic acid; the first 4 carbon esters thereof; acetamide; monoethanolamine; and diethanolamine. The first 4 carbon esters are the methyl; ethyl; propyl; both normal and isopropyl; and butyl ester, normal, isobutyl and tertiary butyl.

9 Claims, No Drawings

CEMENTING OIL AND GAS WELLS

FIELD OF THE INVENTION

The present invention pertains to cementing oil and gas wells with drilling fluid converted to a cementitious slurry and including both a dispersant and an accelerator for the cement. The cement slurry containing the dispersant and accelerator is pumped into the space to be cemented sufficiently to displace substantially all the drilling fluid and bond the desired elements in place, all preventing fluid migration.

BACKGROUND OF THE INVENTION

The prior art is replete with cementing compositions. Specifically, U.S. Pat. No. 3,168,139 to H. T. Kennedy, et al; U.S. Pat. No. 3,499,491 to R. E. Wyant, et al; U.S. Pat. No. 3,557,876 to A. Tregasser; U.S. Pat. No. 3,887,009 to G. L. Miller et al; and U.S. Pat. No. 4,176,722, William N. Wilson disclose well cement compositions which have been formed, at least in part, by well drilling fluids. Other art is discussed and abstracted in the Information Disclosure Statement accompanying this application.

Many prior art efforts to convert drilling fluid to cement material have posed problems in causing increased viscosity and flocculation and slow setting of the cement. In the co-pending application Ser. No. 07/131,878, now U.S. Pat. No. 4,883,125 and Ser. No. 07/342,421, both entitled "Cementing Oil and Gas Wells Using Converted Drilling Fluid", Wilson et al, there was described in more nearly complete detail the problems frequently encountered. Also in application Ser. No. 07/393,546, now U.S. Pat. No. 4,953,620 entitled "NEW CEMENT ACCELERATIONS"; inventors Robert B. Carpenter and Williams N. Wilson, assigned to the assignee of this application, there was also disclosed some of the problems with other accelerators for the cement slurry.

Accordingly, it is an object of this invention to provide an improved composition and method of cementing a well penetrating subterranean formations in which a large portion of the drilling fluid has been converted to cementitious slurry for use to prevent having to dispose of the drilling fluid and all of the problems related thereto; as well as provide a cure for effecting a satisfactory set cement in an acceptable time interval.

SUMMARY OF THE INVENTION

It is an object of this invention to provide at least one of the foregoing features not provided heretofore.

Specifically, it is an object of this invention to provide a method and composition for cementing a well penetrating subterranean formation and employing a portion of the drilling fluid that has been converted to cement; supplying substantially all of the features delineated hereinbefore as desirable and not heretofore provided.

These and other objects will become apparent from the descriptive matter hereinafter.

In accordance with one embodiment of this invention, there is provided an improved method and composition for converting well drilling fluids to cement slurries for cementing at least a portion of the elements in a wellbore penetrating subterranean formations.

In accordance with one aspect of the present invention, an improved slurry is provided by using a drilling fluid converted to the cement slurry by the addition of cementitious materials; a dispersant to minimize the tendency for flocculation or gelation has a disadvantage of not causing the cement to set rapidly; and an accelerator that causes cement to set rapidly even when it has in it retarders that may have been present in the drilling fluid.

The cementitious slurry provides an improved slurry that effects more nearly uniform and complete displacement of the drilling fluid, tends to create good bonding between the cement and the elements in the wellbore when it is set.

In accordance with still a further aspect of the present invention, a cement slurry or composition using drilling fluid is provided wherein the cementitious materials are added along with the dispersant and an accelerator. The dispersant solves some of the problems present with increased gelation and flocculation whereas the accelerator solves some of the problems with not obtaining set cement within an acceptable time period.

The accelerator is selected from a group existing of a small molecule of fatty acid, the first four carbon esters thereof, a small molecule amide, monoethanolamine and diethanolamine.

In the aforementioned Ser. No. 07/131,878, there was illustrated schematic diagrams of wellbore and fluid circulation system as well as schematic diagram of cement mixing and circulation system for a batch or continuous mixing of the cementitious material into the drilling fluid to convert it to a cementitious slurry. This type of equipment and wellbore is so well known that it is not deemed necessary to have drawings in this application. Such applications are also shown in the prior art as shown on the Information Disclosure Statement and patents cited therein without drawings.

DESCRIPTIONS OF PREFERRED EMBODIMENTS

The conversion of well drilling fluids into cement slurries for purposes such as cementing casing in the wellbore into the annulus and to the subterranean formation penetrated and other cementing operations is attractive for several reasons. Specifically, a major portion of the drilling fluid is not subject to waste disposal problems and regulations and the conversion of drilling fluid to cementitious slurry minimizes the handling of the drilling fluid in the cement slurry, it minimizes the cement slurry preparation time and expense and separation between the drilling fluid and the converted cementitious slurry is not required to be maintained as cleanly as with the cement slurries per se.

The conversion of drilling "mud" to a cement slurry is not without some operational problems and undesirable compositional changes when this is done. For example, the addition of cementitious material; such as the Portland cements, lime, silica, alumina, lime and magnesia, silica, alumina and iron oxide, or calcium sulfate and the like; can substantially increase the viscosity of the fluid mixture and result in severe flocculation. Efforts to circulate such mixtures through a wellbore can result in highly unsatisfactory circulation rates, plugging of the wellbore and breakdown of the earth formation in the vicinity of the wellbore and a failure of the cement slurry to properly admix and bond. Certain dispersants have been developed for use in drilling fluids during drilling operations including lignite and lignosulfonates, which are retarders.

One dispersant which has been commercially used in drilling fluids that are to be converted is a low molecular weight styrene sulfonic acid maleic anhydride copolymer and the water soluble salt thereof. These are sometimes known as "SSMA". U.S. Pat. No. 3,730,900 to Perricone, et al describes several drilling fluids which are treated with such a dispersant for stabilizing the rheological and fluid loss properties, particularly under high temperature in the wellbore in the presence of fluid contaminants. As noted on the Information Disclosure Statement, other patents also disclose dispersants for drilling fluids and fluid spacer compositions. In spite of the state of the art as evidenced by these references and as known to applicants, there has remained the problem of effectively converting a drilling fluid to suitable cement composition and displacing the drilling fluid in the borehole, including an annular space between the casing and the borehole wall in a manner, which provides effective occupancy of the area to be cemented with a composition that will form an effective bond as desired.

Moreover, although the addition of certain proportions of certain dispersants reduce the tendency for flocculation or gelation, increased interest in dispersants and retarders have made manifest the need for better dispersants and/or better accelerators to get the desired properties. Specifically, the dispersants that has been employed heretofore have also been retarders that retard the setting time of a cement slurry.

In the foregoing Ser. No. 07/131,878, there was disclosed reference numerals with the figures and it is deemed unnecessary to duplicate that specific information. It is sufficient to simply note that a casing is normally extended into a portion of the formation from a wellhead and a second casing extends into the wellbore to form an annulus which may include washouts or void areas. The casing may be surface strings and a second string of casing extend to the wellhead and be adapted to be in communication with a pump at the surface for circulating drilling fluid to the interior of the casing and up through an annulus to a return conduit. Drilling fluid is conducted through the return conduit to a storage tank or pit and recirculated to the pump through a pumping means and a conduit during normal drilling operation. Conventional drilling fluid equipment includes shale shakers, sand separators and related equipment that are not usually shown anyway in the interest of simplicity.

One method for converting a drilling fluid to cementitious slurry is to simply introduce dry blended cementitious material into the drilling fluid, alone or after water is admixed thereto until the desired density is obtained. A minor proportion of the dispersant with or without the accelerant can be employed in this process. Specifically, from zero up to 100 percent or more of water can be added to the volume of the drilling fluid to be employed. The cementitious material and dry component is then added. For example, the water based drilling fluid may have a density that is normally in the range of 9-18 pounds per gallon (ppg) as it is being circulated in the drilling of the well. Other properties of drilling fluid, well known and not needing description herein, may perform the functions of the drilling mud. After dilution with the water of say from zero to fifty percent water; for example, about ten percent of the drilling fluid volume, the dispersant may be added. The concentration of the dispersant is in the range of 0.5-10 pounds per original barrel of drilling fluid based on a 42 gallon barrel (hereinafter termed "ppb"), and preferably less than about 5 ppb. By adding the dispersant at the time of the conversion of the drilling fluid to cement slurry surprising improvement in the mixing of this cement material into the drilling fluid has been realized.

An excellent dispersant has been shown to be the sulfonated styrene copolymer with maleic anhydride and comprises a low weight styrene sulfonic acid-maleic anhydride copolymer commercially available under the tradename NARLEX D-72 from National Starch and Chemical Corporation, Bridgewater, New Jersey. The dispersant may be preblended with the dry cementitious material and other additives, if desired, and stored, or it may be added to the drilling fluid during the addition of the diluting water. Moreover, the dispersant may also comprise selected quantities of sulfonated styrene amide sulfonated styrene, itaconic acid or a combination of sulfonated styrene copolymer with one or more compounds selected from a group consisting of polyacrylates, potassium salts, phosphonates and other co-polymers such as partially hydrolyzed polyacrylamides. Moreover, it is contemplated that monomers such as maleic anhydride, maleimide and dimethylmaleate may be added in combination with the selected copolymer.

In addition, the accelerator may be added. Preferably, it is added in an amount from 1-10 ppb. preferably about 3-5 ppb. to get the desired set to the cement in the desired time interval. Specifically, instead of having to wait for 30 to 40 hours for the cement slurry to set up, it can be set within 24 hours or less using the accelerator. Probably the best accelerator is the formic acid esters which are priorly described and claimed in an application assigned to the assignee of this application. Herein, the accelerator that is compatible is selected from the class consisting of acetic acid; methylacetate, ethylacetate, the propyl acetates, both normal propyl and isopropyl; and the butyl acetates; including the normal butyl, isobutyl and tertiary butyl acetates. Specifically, these small molecule acetates hydrolyze in the presence of water at relatively elevated pH in the range of 8-12, to give satisfactory acceleration of the set. It is theorized that when an acetate resin is used, the acetic acid is formed by hydrolysis and it then reacts on a minor scale with surrounding constituents to accelerate set of the cement. Regardless of whether the theory is correct or not, it is a fact that the smaller molecules of the fatty acid esters thereof, and small molecule amides, including ammonia and other small molecule amides, can effect acceleration of the set of the cement; as can monoethanolamine and diethanolamine.

Concurrently with or following the addition of the diluting water with or without the dispersant and/or the accelerator to the drilling fluid, Portland cement is added in the range of about 100 ppb. to 600 ppb. Hydration rate control, such as calcium sulfate, can be used in the range of 10 ppb. to 100 ppb. of drilling fluid if desired. Fluid loss control compositions such as inorganic salts, calcium aluminate, lignosulfonates with or without organic acids and polymers such HEC, CMHEC, AMPS and acrylic acids may be premixed with the other materials or with a resulting cement slurry.

The above-described composition may be further modified by the addition of silicas, such as silica flour, in the amount of up to 100 percent by weight of the Portland cement fraction of the cement slurry to increase the high temperature stability thereof. Also, the other cementing mediums such as magnesium salt, calcium aluminate, and the above mentioned calcium sulfate can be added to control slurry thickening time, change the development rate and total compressive strength, as well as to obtain any other desired properties.

The Portland cement may be any of the usual types of cementing materials such as described in Ser. No. 07/393,546. A cement material of the type described in U.S. Pat. No. 3,499,491is commercially available under the name "C-Mix" and can be employed if desired for use in conversion drilling fluids to cement slurries but in this invention, however, the usual abnormally high gelation of the drilling fluid can be controlled by the dispersant and the set of the cement can be accelerated by use of the accelerator. In pursuing the present invention it was decided to test the cement's composition with the addition of the dispersant and accelerator additive in a water based lignosulfonate drilling fluid having a density of approximately 12.3 ppg. A satisfactory cement was obtained.

The cement slurry composition has been tested and found to have properties that indicate that it could be pumped at a satisfactory circulation rate.

The mud to cement technology (MTC) has been developed by the assignee of this invention and the assignee of this invention seeks additional accelerators.

Work has been completed by chemists in the laboratory and some of the conventional type accelerators could not be employed in this application. On the other hand, several compounds have been obtained and put through preliminary screening tests and look encouraging.

Work to date illustrates that an improved cement composition and process has been provided for cementing oil and gas wells and subterranean formation voids or spaces requiring the displacement of a drilling fluid and the emplacement of a cementing material having requisite bonding and strength. Recirculation of the cement slurry may be carried out to assure complete displacement of the drilling fluid with a material which sets to provide the requisite compressive strength when desired. The preliminary testing is encouraging and drilling fluid converted to cement using class A cement in proportions of approximately 250 pounds of cement per barrel of the original drilling fluid with a dispersant and accelerator as indicated in the indicated concentration range have shown a viscosity reduction and antiflocculation characteristics and satisfactory set in an acceptable time interval.

The overall process of cementing a space in a wellbore according to the present invention may also include the displacement of a drilling fluid with a preflushing medium which will further assure that the displacement or removal of the drilling fluid and the bonding of the cement to adjacent structures is enhanced. For example, it is contemplated that the drilling fluid may be displaced from the wellbore by pumping a preflush medium comprising water and other suitable dispersants with or without anionic or nonionic wetting surfactants and with or without viscosifying material such as HEC, CMHEC, PHPA, bentonite, attapulgite, sepiolite and sodium silicate with or without certain waiting material such as barite, hematite, illmenite and/or sand. It is acceptable to form a rheologically compatible medium for displacing the drilling fluid and then be itself displaced by conventional Portland cement slurry, even when made by converting the drilling fluid to a cementitious slurry.

There is provided an improved well composition and process for cementing using the drilling fluid or a major portion thereof which has been converted to cement composition by addition of one or more cementitious materials, dispersant and accelerator as indicated. The recirculating of the drilling fluid-to-cement conversion composition through the well bore to completely displace or convert the drilling fluid is within the purvey of this invention.

A preferred embodiment of the method involves producing cement composition of batch process until all of the drilling fluid required for the cementing operation has been converted. Alternatively, the materials added to the drilling fluid to convert it to cement may be continuously added in a stream of drilling fluid as it is circulated in the wellbore. The process of recirculating the drilling fluid converted to cement in a volume range of from 10 percent to 1000 percent of the displacement volume of the wellbore space provides substantial assurance that all the drilling fluid has been displaced from the wellbore and that washouts, voids or other imperfections in the cement jacket or annulus are minimized.

A desirable cement composition in accordance with this invention is one that permits complete circulation of the fluid out of the wellbore and replacement with the cement composition itself. Since this circulation may normally comprise two to as many as ten complete displacements of the system volume which includes the wellbore, the mixing tanks or pits and all the interconnecting conduits, it is desirable that the composition not commence thickening or setting until circulation is complete. It has been found that this can be controlled with the accelerators of this invention whereas other accelerators are too strong, or act too rapidly.

Having thus described the invention, it will be understood that such description has been given by way of illustration example and not by way of limitation, reference for the latter purpose being had top the appended claims.

What is claimed is:

1. A method for cementing a wellbore penetrating an earth formation to which a conduit extends, said wellbore having a space occupied by a fluid composition to be converted to cement for cementing said space to form a seal between spaced apart points in said formation, said method comprising the steps of:
   providing means for adding cementitious material and a dispersant to said fluid, circulating said fluid and adding said cementitious material and said dispersant to a quantity of the fluid in predetermined proportions to form a settable cement composition comprising
   a major portion of the drilling fluid in the well as it was drilled; and
   water;
   a lesser proportion of dry cementitious material;
   a minor amount of a dispersant that does not effect a satisfactory set cement within an acceptable time interval; and
   a compatible accelerator selected from the class consisting of acetic acid; the first four carbon esters thereof; and acedamide and
   filling said wellbore with said cement composition.

2. The method as set forth in claim 1 including the steps of recirculating a volume of the cement composition through said space.

3. The method set forth in claim 2 wherein said dispersant is selected from the group consisting of styrene sulfonic acid maleic anhydride, sulfonated styrene imide, and a sulfonated styrene copolymer in combination with a polyacrylate, a potassium salt, a phosphonate and a partially hydrolyzed polyacrylamide.

4. The method set forth in claim 3 wherein said dispersant is added in a proportion between 0.5 ppb and 10.0 ppb of the original drilling fluid and cementitious material is added to the fluid at the rate of about 100 ppb to about 600 ppb of original drilling fluid.

5. The method set forth in claim 4, further including the step of:

adding at least two cementitious materials to said fluid to control the hydration rate of said cement composition and selected from a group consisting of Portland cement, calcium sulfate and calcium aluminate.

6. The method set forth in claim 5, also including the step of:

displacing drilling fluid from said space with a preflush composition comprising water and a sulfonated styrene copolymer to form a rheologically compatible material for displacing said drilling fluid prior to filling said wellbore space with said cement composition.

7. A method for cementing a space in a wellbore penetrating an earth formation wherein said space in said wellbore is occupied by a drilling fluid, said method comprising the steps of:

adding cementitious material and a dispersant to a quantity of said drilling fluid to form a cement composition comprising a major portion of the drilling fluid from the well as it was drilled;

water;

a lesser proportion of dry cementitious material;

a minor amount of a dispersant that does not effect a satisfactory set cement within an acceptable time interval; and a compatible accelerator selected from the class consisting of acetic acid; the first four carbon esters thereof; and acetamide; and circulating said cement composition into said wellbore and continuing the circulation of said cement composition through said wellbore until a total displacement of cement composition through said wellbore is equal to at least 100 percent to 1000 percent of the volume of said space in said wellbore.

8. A method for cementing a wellbore penetrating an earth formation to which a conduit extends, said wellbore having a space occupied by a fluid composition to be converted to cement for cementing said space to form a seal between spaced apart points in said formation, said method comprising the steps of:

providing means for adding cementitious material and a dispersant to said fluid, circulating said fluid and adding said cementitious material and said dispersant to a quantity of the fluid in predetermined proportions to form a settable cement composition consisting of a major portion of the drilling fluid from the well as it was drilled;

water;

a lesser proportion of dry cementitious material;

a minor amount of a dispersant that does not effect a satisfactory set cement within an acceptable time interval; and a compatible accelerator consisting of monoethanolamine and diethanolamine; and filling said wellbore with said cement composition.

9. A method for cementing a space in a wellbore penetrating an earth formation wherein said space in said wellbore is occupied by a drilling fluid, said method comprising the steps of:

adding cementitious material and a dispersant to a quantity of said drilling fluid to form a cement composition consisting of a major portion of the drilling fluid from the well as it was drilled;

water;

a lesser proportion of dry cementitious material;

a minor amount of a dispersant that does not effect a satisfactory set cement within an acceptable time interval; and a compatible accelerator consisting of monoethanolamine and diethanolamine circulating said cement composition into said wellbore and continuing the circulation of said cement composition through said wellbore until a total displacement of cement composition through said wellbore is equal to at least 100 percent to 1000 percent of the volume of said space in said wellbore.

* * * * *